(12) United States Patent
Czarny et al.

(10) Patent No.: US 10,554,681 B2
(45) Date of Patent: *Feb. 4, 2020

(54) COMPUTER SECURITY VULNERABILITY ASSESSMENT

(71) Applicant: OPSWAT, Inc., San Francisco, CA (US)

(72) Inventors: Benjamin Czarny, San Francisco, CA (US); Jianpeng Mo, Burlingame, CA (US); Ali Rezafard, Millbrae, CA (US); David Matthew Patt, Kansas City, MO (US)

(73) Assignee: OPSWAT, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,139

(22) Filed: Oct. 29, 2018

(65) Prior Publication Data

US 2019/0075129 A1 Mar. 7, 2019

Related U.S. Application Data

(63) Continuation of application No. 15/664,670, filed on Jul. 31, 2017, now Pat. No. 10,116,683, which is a (Continued)

(51) Int. Cl.
*H04L 29/06* (2006.01)
*G06F 21/57* (2013.01)
*G06F 16/21* (2019.01)

(52) U.S. Cl.
CPC .......... *H04L 63/1433* (2013.01); *G06F 16/21* (2019.01); *G06F 21/577* (2013.01); *H04L 63/1425* (2013.01); *H05K 999/99* (2013.01)

(58) Field of Classification Search
CPC ............ G06F 21/577; G06F 17/30289; H04L 29/06904; H04L 63/1433; H04L 63/1425
(Continued)

(56) References Cited

U.S. PATENT DOCUMENTS 7,734,931 B2   6/2010  Carter et al.
8,127,354 B1   2/2012  Bettini et al.
(Continued)

OTHER PUBLICATIONS

Mellor, FlashMate hybrid hard drive works without Windows, InfoWorld, Oct. 11, 2007. pp. 1-2.
(Continued)

*Primary Examiner* — Shahriar Zarrineh
(74) *Attorney, Agent, or Firm* — MLO, a professional corp.

(57) ABSTRACT

Computer security vulnerability assessment is performed with product binary data and product vulnerability data that correspond with product identification data. A correspondence between the product binary data and the product vulnerability data is determined, and a binaries-to-vulnerabilities database is generated. The binaries-to-vulnerabilities database is used to scan binary data from a target device to find matches with the product binary data. A known security vulnerability of the target device is determined based on the scanning and the correspondence between the product binary data and the vulnerability data. In some embodiments, the target device is powered off and used as an external storage device to receive the binary data therefrom.

16 Claims, 8 Drawing Sheets

Related U.S. Application Data continuation of application No. 15/275,123, filed on Sep. 23, 2016, now Pat. No. 9,749,349.

(58) Field of Classification Search
USPC .......................................................... 726/25
See application file for complete search history.

(56) References Cited

U.S. PATENT DOCUMENTS

| | | | |
|---|---|---|---|
| 8,266,703 B1* | 9/2012 | Magdych | H04L 63/1433 726/25 |
| 8,302,196 B2 | 10/2012 | Soderberg et al. | |
| 8,474,004 B2 | 6/2013 | Leone | |
| 8,645,340 B2 | 2/2014 | Kester et al. | |
| 8,654,340 B2 | 2/2014 | Girard et al. | |
| 8,813,222 B1 | 8/2014 | Codreanu et al. | |
| 8,850,583 B1 | 9/2014 | Nelson et al. | |
| 8,863,288 B1 | 10/2014 | Savage et al. | |
| 9,304,980 B1 | 4/2016 | Hartsook et al. | |
| 9,716,727 B1 | 7/2017 | Seger et al. | |
| 9,871,815 B2 | 1/2018 | Ouchn | |
| 2002/0178383 A1 | 11/2002 | Hrabik et al. | |
| 2003/0195861 A1 | 10/2003 | McClure et al. | |
| 2004/0006704 A1 | 1/2004 | Dahlstrom et al. | |
| 2005/0015760 A1 | 1/2005 | Ivanov et al. | |
| 2005/0022021 A1 | 1/2005 | Bardsley et al. | |
| 2005/0132206 A1 | 6/2005 | Palliyil et al. | |
| 2007/0011319 A1* | 1/2007 | McClure | G02B 6/105 709/224 |
| 2007/0067846 A1 | 3/2007 | McFarlane et al. | |
| 2007/0226794 A1 | 9/2007 | Howcroft et al. | |
| 2007/0271360 A1 | 11/2007 | Sahita et al. | |
| 2008/0098479 A1 | 4/2008 | O'Rourke et al. | |
| 2009/0119647 A1 | 5/2009 | Kim et al. | |
| 2010/0083346 A1 | 4/2010 | Forman et al. | |
| 2011/0119765 A1 | 5/2011 | Hering et al. | |
| 2011/0173693 A1* | 7/2011 | Wysopal | G06F 11/3612 726/19 |
| 2011/0179477 A1 | 7/2011 | Starnes et al. | |
| 2011/0321164 A1 | 12/2011 | Saxena et al. | |
| 2012/0072968 A1 | 3/2012 | Wysopal et al. | |
| 2012/0222122 A1 | 8/2012 | Das | |
| 2012/0284221 A1* | 11/2012 | Shelton | H04L 41/0604 706/47 |
| 2012/0304300 A1 | 11/2012 | LaBumbard | |
| 2013/0191919 A1 | 7/2013 | Basavapatna et al. | |
| 2013/0311496 A1 | 11/2013 | Fedorenko et al. | |
| 2014/0137190 A1 | 5/2014 | Carey et al. | |
| 2014/0173737 A1 | 6/2014 | Toback et al. | |
| 2014/0173738 A1 | 6/2014 | Condry et al. | |
| 2015/0127607 A1 | 5/2015 | Savage et al. | |
| 2015/0207811 A1 | 7/2015 | Feher et al. | |
| 2015/0213272 A1 | 7/2015 | Shezaf et al. | |
| 2015/0242637 A1* | 8/2015 | Tonn | G06F 21/577 726/25 |
| 2015/0326601 A1* | 11/2015 | Grondin | G06F 16/24578 726/25 |
| 2015/0363294 A1 | 12/2015 | Carback et al. | |
| 2015/0365437 A1 | 12/2015 | Bell et al. | |
| 2016/0006704 A1 | 1/2016 | Maruyama | |
| 2016/0085970 A1* | 3/2016 | Rebelo | G06F 21/51 726/25 |
| 2016/0099963 A1* | 4/2016 | Mahaffey | H04L 63/0227 726/25 |
| 2016/0112444 A1 | 4/2016 | Palumbo et al. | |
| 2016/0188882 A1 | 6/2016 | Mahrous et al. | |
| 2016/0188885 A1 | 6/2016 | Lee et al. | |
| 2016/0232358 A1 | 8/2016 | Grieco | |
| 2016/0300063 A1 | 10/2016 | Daymont | |
| 2016/0381060 A1 | 12/2016 | Floering | |
| 2016/0381063 A1 | 12/2016 | Oberheide et al. | |
| 2017/0286689 A1 | 10/2017 | Kelley et al. | |
| 2017/0318048 A1 | 11/2017 | Htay | |
| 2017/0357809 A1 | 12/2017 | Smith | |

OTHER PUBLICATIONS

Mitchell, Web Security Pop-Up Trojan Making Rounds Again, This Time Attacking Both Windows and Macs, The Internet Patrol, May 9, 2011, pp. 1-4, Accessed on May 30, 2016, https://www.theinternetpatrol.com/websecuritypopuptrojanmakinggroundsagainthistimeattackingbothwindowsandmacs/.

Notice of Allowance dated Jul. 6, 2018 for U.S. Appl. No. 15/664,670.

Notice of Allowance dated May 3, 2017 for U.S. Appl. No. 15/275,123.

Office Action dated Jan. 23, 2018 for U.S. Appl. No. 15/664,670.

Office Action dated Nov. 30, 2016 for U.S. Appl. No. 15/275,123.

Os X El Capitan [OT], NeoGAF, May 27, 2016, p. 34, 3 pages, Accessed on May 30, 2016, http://www.neogaf.com/forum/showthread.php?p=204835278.

\* cited by examiner

| Product | Version | Binary Files |
|---|---|---|
| ESET Endpoint Security | 5.0.2214.4 | Exe1_sha256, Exe2_sha256, Dll3_sha256, ... |
| ESET Endpoint Security | 5.0.1055.2 | Exe1_sha256, Exe4_sha256, Dll5_sha256, ... |
| ESET Endpoint Security | 4.2.3330.1 | Exe1_sha256, Exe2_sha256, Dll5_sha256, ... |
| ESET Endpoint Security | 4.0.1211.2 | Dll3_sha256, Dll5_sha256, Exe1_sha256, ... |
| JAVA | 7.11 | Dll9_sha256, Dll12_sha256, Dll13_sha256, ... |
| ... | ... | ... |

| Product | Version | Known Vulnerabilities |
|---|---|---|
| ESET Endpoint Security | 5.0.2214.4 | Vulner_1, Vulner_2, Vulner_3, Vulner_4, ... |
| ESET Endpoint Security | 5.0.1055.2 | Vulner_1, Vulner_2, Vulner_5, Vulner_6, ... |
| ESET Endpoint Security | 4.2.4230.1 | Vulner_1, Vulner_2, Vulner_7, Vulner_8, ... |
| ESET Endpoint Security | 4.0.1211.2 | Vulner_1, Vulner_2, Vulner_3, Vulner_6, ... |
| Adobe Flash | 3.0.5 | Vulner_2, Vulner_9, Vulner_10, ... |
| ... | ... | ... |

| Product | Version | Binary Files | Known Vulnerabilities |
|---|---|---|---|
| ESET Endpoint Security | 5.0.2214.4 | Exe1_sha256, Exe2_sha256, Dll3_sha256, ... | Vulner_1, Vulner_2, Vulner_3, Vulner_4, ... |
| ESET Endpoint Security | 5.0.1055.2 | Exe1_sha256, Exe4_sha256, Dll5_sha256, ... | Vulner_1, Vulner_2, Vulner_5, Vulner_6, ... |
| ESET Endpoint Security | 4.2.3330.1 | Exe1_sha256, Exe2_sha256, Dll5_sha256, ... | Vulner_1, Vulner_2, Vulner_4, Vulner_6, ... |
| ESET Endpoint Security | 4.0.1211.2 | Dll3_sha256, Dll5_sha256, Exe1_sha256, ... | Vulner_1, Vulner_2, Vulner_3, Vulner_6, ... |
| JAVA | 7.11 | Dll9_sha256, Dll12_sha256, Dll13_sha256, ... | |
| Adobe Flash | 3.0.5 | | Vulner_2, Vulner_9, Vulner_10, ... |
| ... | ... | ... | ... |

| Binary File | Known Vulnerabilities |
| --- | --- |
| Exe1_sha256 | Vulner_1, Vulner_2, ... |
| Exe2_sha256 | Vulner_4, ... |
| Exe4_sha256 | Vulner_5, ... |
| Dll3_sha256 | Vulner_3, ... |
| Dll5_sha256 | Vulner_6, ... |
| ... | ... |

Target Device Vulnerability Report
1. Binary_1, Hash_1, Filepath_1, [Vulner_1, Vulner_2, ... ]
2. Binary_2, Hash_2, Filepath_2, [Vulner_2, Vulner_4, ... ]
3. Binary_3, Hash_3, Filepath_3, [Vulner_3, Vulner_5, ... ]
   ...
N. Binary_N, Hash_N, Filepath_N, [Vulner_*, Vulner_**, ... ]

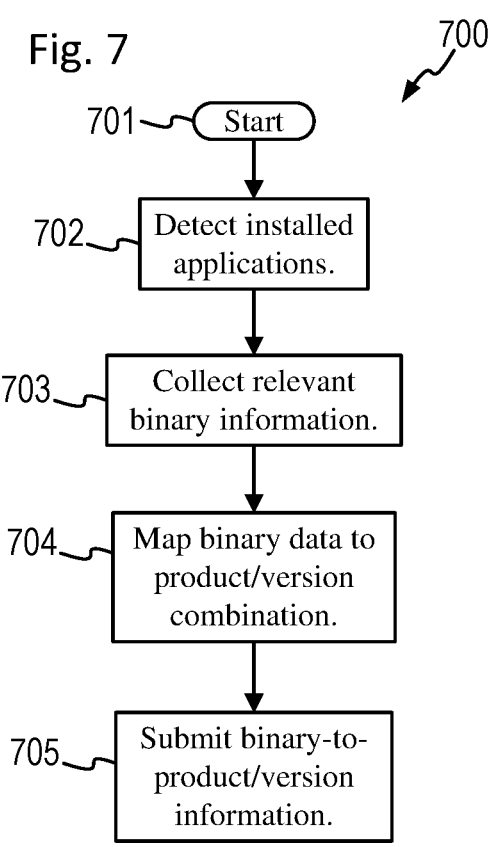

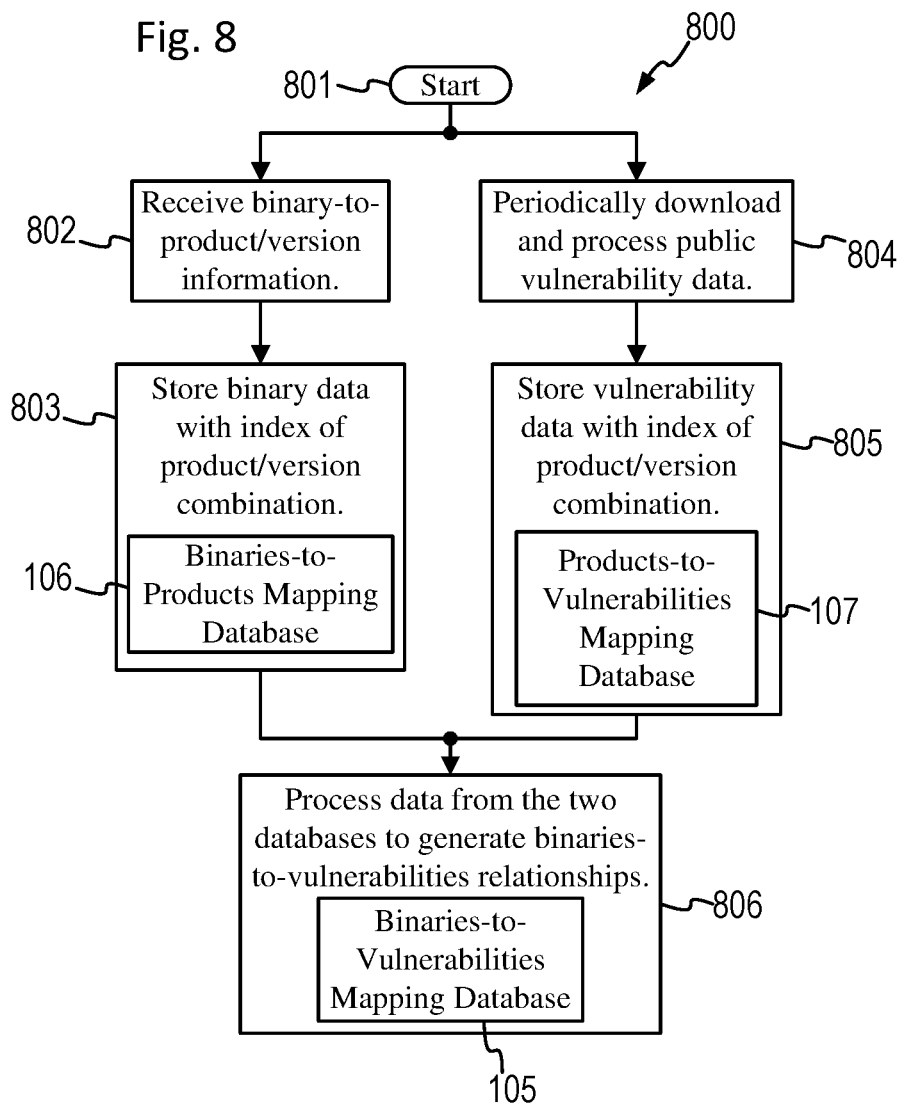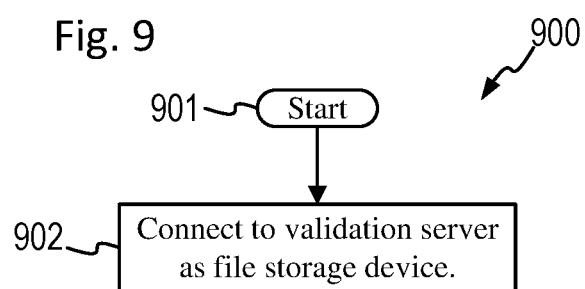

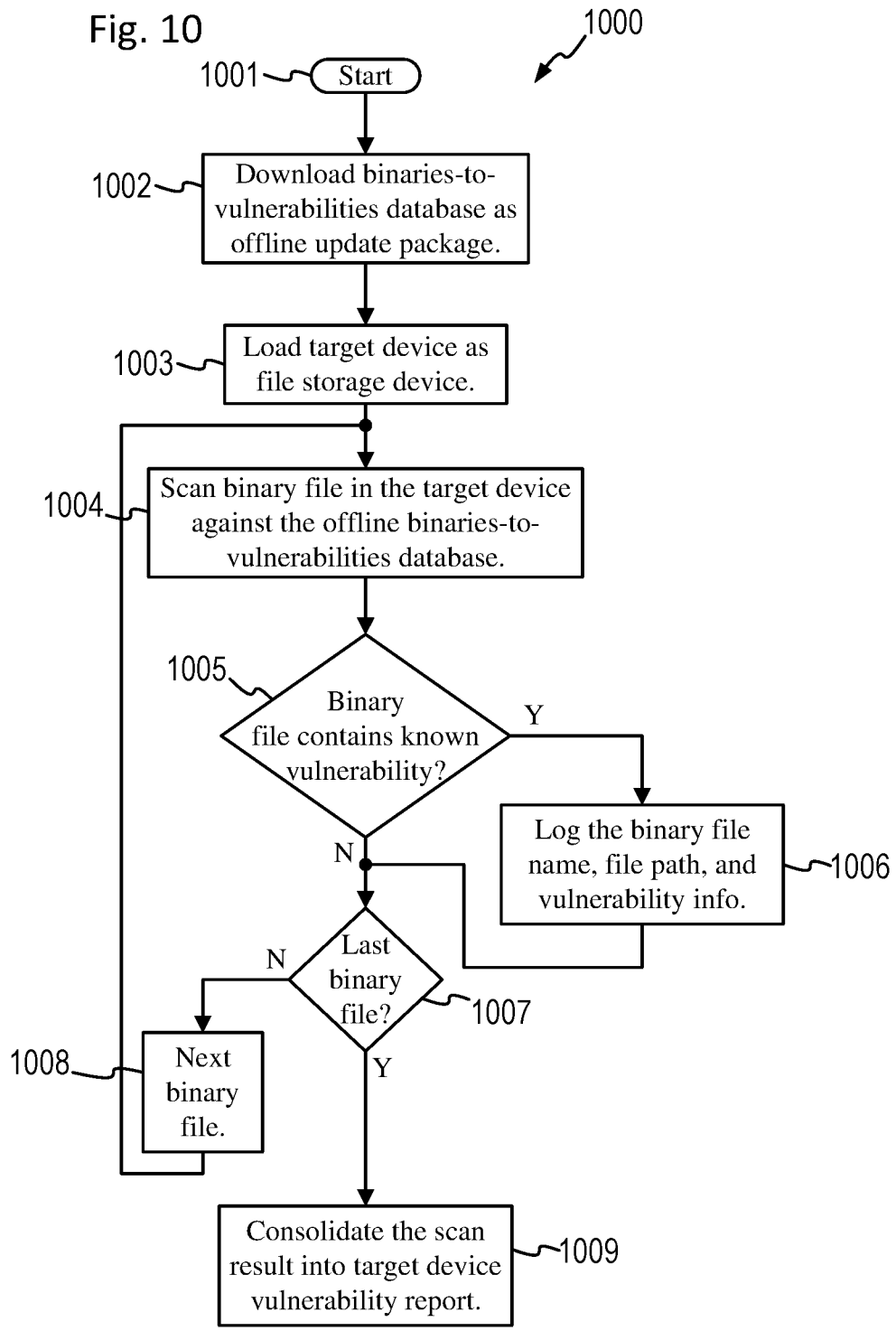

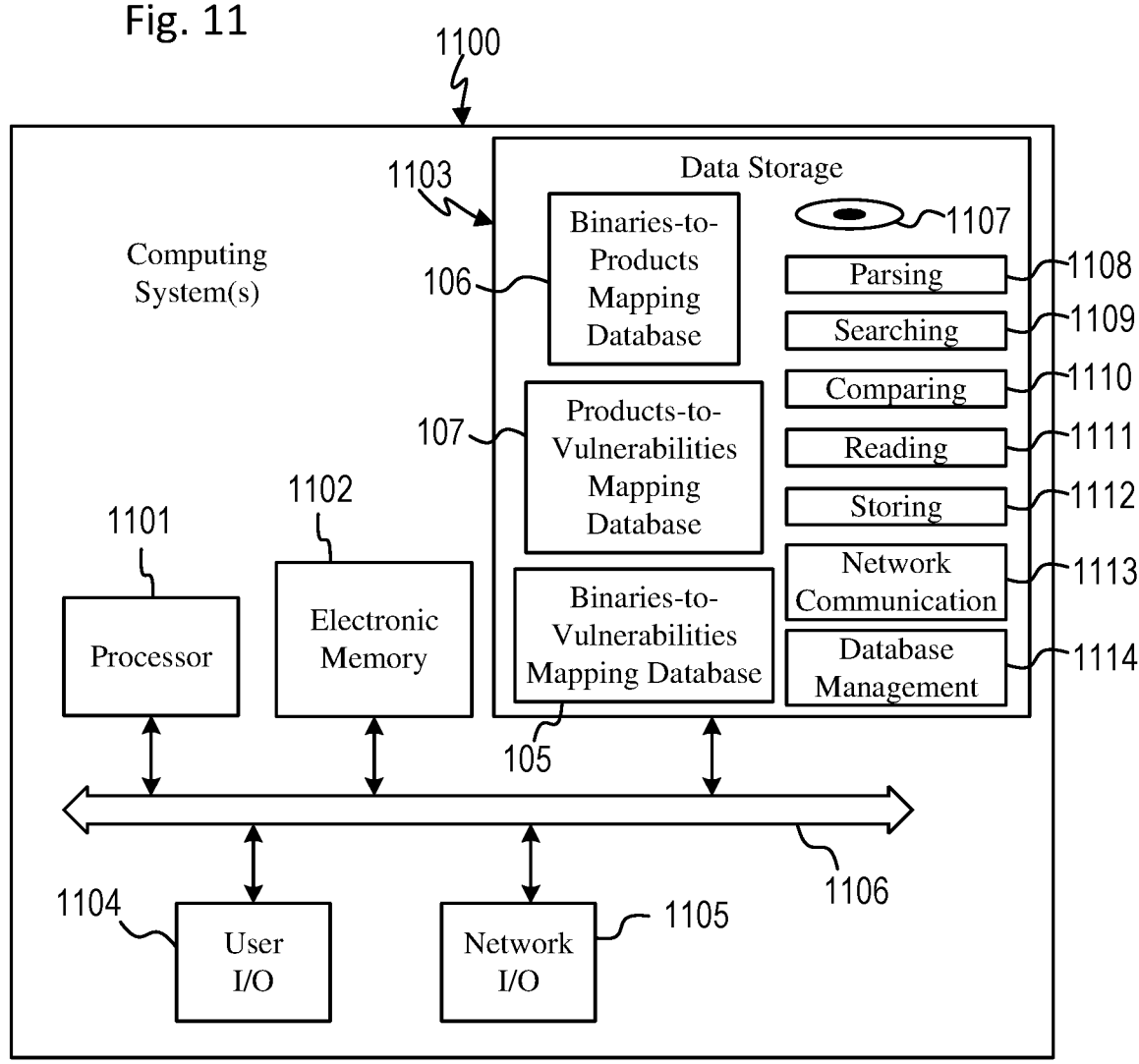

COMPUTER SECURITY VULNERABILITY ASSESSMENT

CROSS REFERENCE TO RELATED APPLICATIONS

This application is a continuation of U.S. patent application Ser. No. 15/664,670 filed Jul. 31, 2017, which is a continuation of U.S. patent application Ser. No. 15/275,123 filed Sep. 23, 2016; both of which are incorporated herein by reference in their entirety.

BACKGROUND OF THE INVENTION

Vulnerability assessment and malware detection are two fields or industries that deal with issues of computer security. A positive malware detection generally requires an immediate response to eliminate a threat to the computer device of a potentially imminent malicious event. Typically, the response is to quarantine, remove, or replace the software file of the malware. With a positive vulnerability assessment, on the other hand, the computer device can usually continue to operate without concern for a threat to the computer device, since a malicious event is not necessarily imminent. However, if the computer device is going to be used in an environment that has a particular security standard, then there is considerable concern over whether the computer device meets that security standard or would present a security problem for the environment. For example, if the computer device is to be used in a medical facility with a secure network through which the computer device will have access to confidential patient records, then it is very important to determine whether the computer device is hosting or executing any binary files that are known to be easy targets for hackers to gain access to the computer device and from there to any other computer or data storage device accessible through the secure network. Therefore, before the computer device can be granted access to the secure network, the vulnerability to malicious events of the computer device must be assessed, and any known vulnerabilities must be remedied or eliminated. The assessment must be thorough, robust, secure, quick and efficient, in order to prevent security problems, while allowing business operations to proceed with minimal interruption.

SUMMARY OF THE INVENTION

In some embodiments, a more thorough, more robust, more flexible and more secure computer security vulnerability assessment is achieved with a method in which a computerized system receives product binary data and first product identification data that correspond to each other. The computerized system receives product vulnerability data and second product identification data that correspond to each other. The computerized system determines a correspondence between the product binary data and the product vulnerability data based on matching the first product identification data with the second product identification data. The computerized system generates a binaries-to-vulnerabilities database based on the determined correspondence between the product binary data and the product vulnerability data. Additionally, the binaries-to-vulnerabilities database can be used with a scan of target binary data from a target device to determine a known security vulnerability of the target device.

In some embodiments, a more thorough, more robust, more flexible and more secure computer security vulnerability assessment is achieved with a method in which a computerized system receives a binaries-to-vulnerabilities database that provides a correspondence between binary data and vulnerability data. The computerized system establishes a communication connection to a target device. The computerized system receives binary files from the target device. The computerized system uses the binaries-to-vulnerabilities database to scan the binary files to find matches between the binary files and the binary data. The computerized system determines a known security vulnerability of the target device based on 1) results of the scanning and 2) the correspondence between the binary data and the vulnerability data.

In some embodiments, a more thorough, more robust, more flexible and more secure computer security vulnerability assessment is achieved with a method in which a computerized system receives product binary data and first product identification data that correspond to each other. The computerized system receives product vulnerability data and second product identification data that correspond to each other. The computerized system determines a correspondence between the product binary data and the product vulnerability data based on matching the first product identification data with the second product identification data. The computerized system establishes a communication connection to a target device. The computerized system receives target binary files from the target device. The computerized system uses the product binary data to scan the target binary files to find matches between the target binary files and the product binary data. The computerized system determines a known security vulnerability of the target device based on 1) results of the scanning and 2) the correspondence between the product binary data and the product vulnerability data.

In some embodiments, the computerized system 1) grants access by the target device to a secure environment based on determining that the target device has no known security vulnerability; and 2) denies access by the target device to the secure environment based on determining that the target device has the known security vulnerability. In some embodiments, the product vulnerability data describes a vulnerability to a malicious event of a computer device that contains a software product corresponding to the product binary data, regardless of whether the software product is infected with malicious code. In some embodiments, the product binary data contains strings of bits, bytes, words or characters extracted from files of software products. In some embodiments, the product binary data contains hashes of strings of bits, bytes, words or characters extracted from files of software products. In some embodiments, the computerized system collects the product binary data and the first product identification data from a plurality of client devices; and each client device collects the product binary data and the first product identification data related to software products that are on that client device and maps the product binary data to the corresponding first product identification data for each of the software products. In some embodiments, the target device is a computer that has been turned off; and the computerized system loads the target device as an external storage device. In some embodiments, the computerized system generates a report containing at least a listing of 1) designations of the binary data that was found to match the binary files, and 2) designations of the vulnerability data that correspond to the binary data that was found to match the binary files. In some embodiments, the computerized system receives an indication of one of a first, second or third level of vulnerability assessment to be performed on the target device; wherein: in the first level of vulnerability assessment, the target binary files are executable binary files; in the second level of vulnerability assessment, the target binary files are the executable binary files and library files used by the executable binary files; and in the third level of vulnerability assessment, the target binary files are all binary files stored on the target device.

BRIEF DESCRIPTION OF THE DRAWINGS

FIGS. 2-5 are simplified database structures for use by, or generated by, the example computer security vulnerability assessment system shown in FIG. 1, in accordance with some embodiments.

FIG. 6 is a simplified report generated by the example computer security vulnerability assessment system shown in FIG. 1, in accordance with some embodiments.

FIGS. 7-10 are simplified flowcharts of processes performed by components of the example computer security vulnerability assessment system shown in FIG. 1, in accordance with some embodiments.

FIG. 11 is a simplified schematic diagram of a vulnerability database system for use in the example computer security vulnerability assessment system shown in FIG. 1, in accordance with some embodiments.

DETAILED DESCRIPTION OF THE INVENTION

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1:
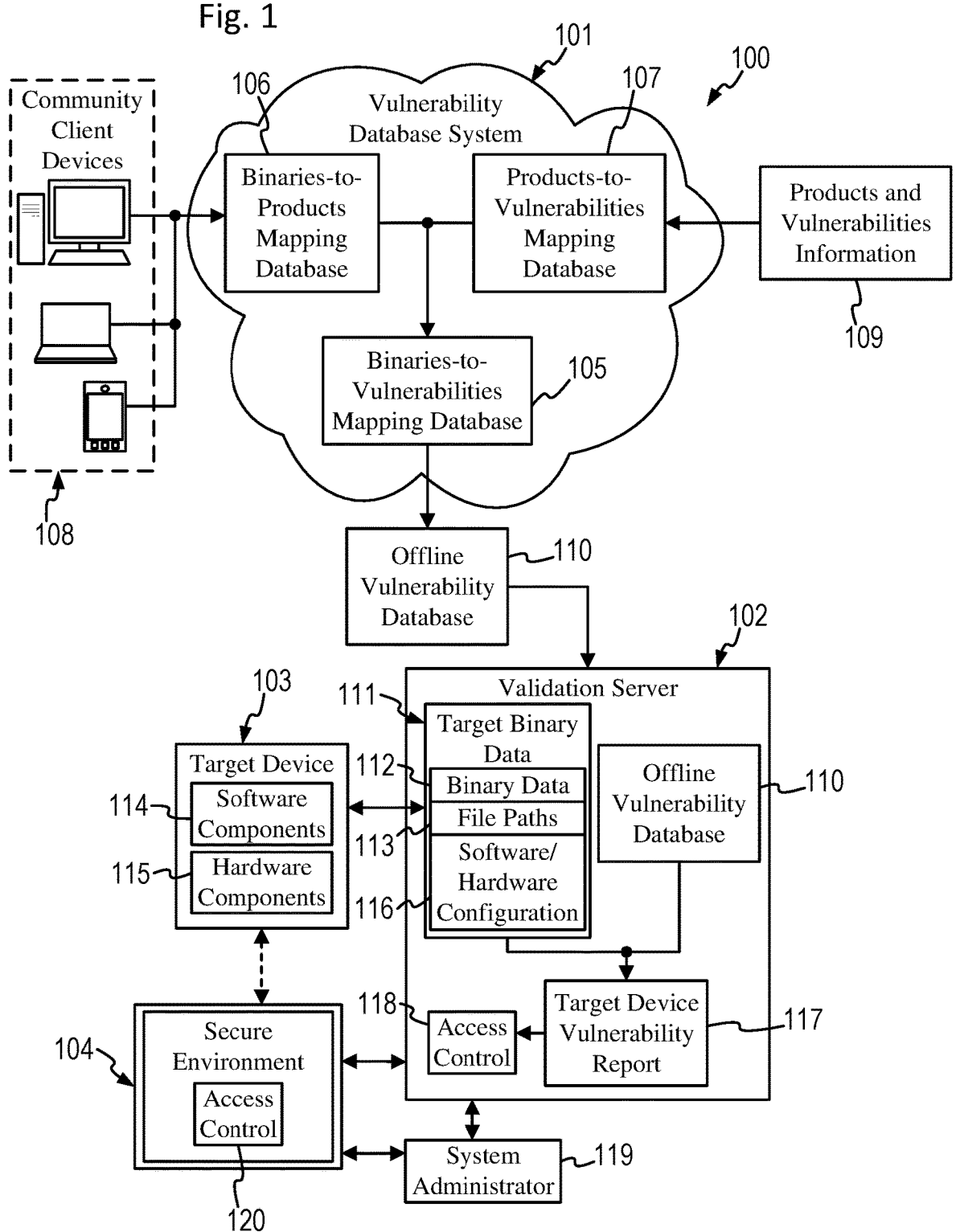
FIG. 1 is a simplified schematic diagram of an example computer security vulnerability assessment system, in accordance with some embodiments.

FIG. 1 shows an example computer security vulnerability assessment system 100 that provides a more thorough, robust, flexible and secure computer security vulnerability assessment, in accordance with some embodiments. The illustrated embodiment with the components shown is provided for explanatory purposes only, and other embodiments could use other specific components or combinations of components. In the illustrated embodiment, the computer security vulnerability assessment system 100 generally includes a vulnerability database system 101 and a validation server 102. The validation server 102 generally uses data generated by the vulnerability database system 101 to assess a security vulnerability of a target device 103, e.g., as a means for network or domain access control for determining whether to grant access by the target device 103 to a secure environment 104, for determining whether to transfer the target device 103 from a lower security domain or environment to a higher security domain, for a security compliance check procedure, for performing a data security transfer, or for determining a computer device's "health." To do so, the vulnerability database system 101 generally associates binary data (related to software products, or specific versions of the software products, i.e. "product binary data") with known security vulnerabilities (of the same software products, or specific versions thereof, i.e. "product vulnerability data"). The validation server 102 then scans (i.e., reads and searches through) binary data from the target device 103 (i.e. "target binary data") to determine whether any of the target binary data matches the product binary data, thereby establishing a link to the product vulnerability data. Known security vulnerabilities of the target device 103 are thus determined by this scan of binary data. Based on this security vulnerability determination, the computer security vulnerability assessment system 100, or an administrator thereof, can further determine whether to grant access by the target device 103 to the secure environment 104.

The binary data (for the product binary data or the target binary data) generally contains 1) binary hashes of binary level files of the software products, 2) binary hashes of strings of bits, bytes, words or characters extracted from the files of the software products, 3) the unprocessed strings of bits, bytes, words or characters that were extracted, 4) the complete binary level files of the software products, or 5) any other appropriate binary-level representation of the software products. In various embodiments, therefore, the scanning of the target binary data and the matching with the product binary data is done at the individual bit, byte, word, character, string, etc. level, e.g., as can be performed with the "find" or "findstr" command available in the Windows™ command prompt or other string, binary, or file matching or comparing type of function. The scanning and matching searches for a match between two files or two strings within two files at the low level of binary data, rather than matching a file name or other higher level meta data of two files.

The binary data is distinguished from data that simply identifies the software products or applications, e.g., the name and version of the software products or the file names or meta data of application files associated with, or mapped to, the software products. Conventional security vulnerability assessment systems use such file identification data (to determine which software products are on the target device 103 and then to assess the security vulnerability of the target device 103 in accordance therewith). However, this conventional technique is less thorough, robust or flexible than the present system, because it could potentially miss some known vulnerabilities, since the actual binary level data in the files of the software product could be different from the official version of the software product. For example, some of the files could be corrupted or infected with malware, which would not be detected by a conventional vulnerability assessment system that simply looks at file identification data. The computer security vulnerability assessment system 100, thus, can be used in place of a conventional security vulnerability assessment system, or in combination therewith, to enable a more thorough, robust and flexible level of functionality that is not available in conventional security vulnerability assessment systems.

Additionally, a vulnerability scan or assessment is distinguished from a malware scan or detection procedure. Vulnerability assessment attempts to determine whether a computer device is vulnerable to a malicious event, such as malware infection, hacking, intrusion, data corruption, data theft, spoofing, phishing, etc., regardless of whether the computer device is actually compromised by any type of malicious code or software. In a sense, vulnerability is similar to a security defect in the software that an external third party could take advantage of to take control of or damage the computer device. Thus, a vulnerability may render the computer device susceptible to malware. However, a vulnerability is not necessarily a problem, since no malicious event may have occurred, and the computer device and the software products can continue to perform in an acceptable manner. Malware detection, on the other hand, generally attempts to determine whether a computer device or software product has been infected with any known type of malicious code or software, such as a virus, a trojan, etc., and usually results in a recommendation of whether the software product or malicious code should be removed from, or not be allowed to run on, the computer device. Thus, although a malware scan may look at binary data, the result is a determination of whether a file or computer device is actually infected, rather than being simply vulnerable to infection, such that there is a clear and present danger that renders the computer device or the software products incapable of performing in an acceptable manner. Additionally, in some situations, it is possible to find malware on a computer without necessarily finding a security vulnerability. The computer security vulnerability assessment system 100, thus, performs a different function than, and takes a distinctly different view of security issues from, a malware detection system.

The vulnerability database system 101 is generally a computerized system (e.g., one or more computer devices or a central server implemented in a cloud-based computing environment) for generating and maintaining a large binaries-to-vulnerabilities mapping database 105. The binaries-to-vulnerabilities mapping database 105 associates binary data with known security vulnerabilities by establishing links between the binary data (related to software products, or specific versions of the software products) and the known security vulnerabilities (of the same software products, or specific versions thereof). Thus, formation of the binaries-to-vulnerabilities mapping database 105 is based on a determined correspondence between the product binary data and the product vulnerability data.

In some embodiments, the vulnerability database system 101 collects or gathers information to generate the binaries-to-vulnerabilities mapping database 105. The collected information is generally in the form of a binaries-to-products mapping database 106 and a products-to-vulnerabilities mapping database 107. The binaries-to-products mapping database 106 contains links between the product binary data and corresponding product version identification data (e.g., the binary data may be linked to the product version identification data of according to each binary file's absolute file path, file property information, digital signature, copyright, etc.). The products-to-vulnerabilities mapping database 107 contains links between product vulnerability data (e.g., known security vulnerabilities) and the corresponding product version identification data.

A conventional vulnerability assessment system, for example, typically uses data similar to that in the products-to-vulnerabilities mapping database 107. The vulnerability database system 100, however, goes further by matching the product version identification data in the two databases 106 and 107 to determine links or correspondences between the product binary data and the product vulnerability data and to generate the binaries-to-vulnerabilities mapping database 105 in accordance therewith.

In some embodiments, the product binary data and the corresponding product version identification data for the binaries-to-products mapping database 106 is received from various community client devices 108. The community client devices 108 are generally any appropriate computer devices, such as desktop computers, notebook computers, tablet computers, smartphones, servers, etc. A community client application running on the community client devices 108 generally scans the binary files of the software products that have been installed on the community client devices 108 and generates the product binary data therefrom. The various community client applications map the product binary data (e.g., including complete file binary data for a binary hash of the file binary data) to the corresponding product version identification data (e.g., including file names, product names, vendor names, product version designators, product category, etc.) and submits this information to the vulnerability database system 101. The community client devices 108, therefore, submit to the vulnerability database system 101 real data for the product binary data from actual usage of the software products in the field, rather than relying on the documented versions of the software products. In this manner, the vulnerability database system 101 also takes into consideration more than just generally available software; for example, support is provided for custom or unofficial versions of software (that a vendor may make available to only one or a few special users) and beta software releases. The vulnerability database system 101 can cross reference different submissions from different community client devices 108, process the received information, and store the information in the binaries-to-products mapping database 106. Alternatively, the binaries-to-products mapping database 106 could be generated from an existing file information service or from copies of the files of the software products. However, a benefit of using the community client devices 108 to produce the product binary data and the corresponding product version identification data is the ability to normalize the data and improve the accuracy of binary ownership.

In some embodiments, the product vulnerability data and the corresponding product version identification data for the products-to-vulnerabilities mapping database 107 is received from various products and vulnerabilities information sources 109. There are a variety of sources 109 for known product vulnerability and severity information, including CVE (Common Vulnerabilities and Exposures), NVD (National Vulnerability Database) and OSVDB (Open Sourced Vulnerability Database). These sources 109 generate vulnerability data that is specific to a given product and version combination. The vulnerability database system 101 periodically downloads this information, processes this information, and forms the products-to-vulnerabilities mapping database 107 therefrom.

The validation server 102 is generally a computerized system for using the binaries-to-vulnerabilities and mapping database 105 to assess the security vulnerability of the target device 103 and thereby validate the target device 103 for use in the secure environment 104. The validation server 102 represents any number of computer devices at any number of locations, such as at multiple business operation facilities, where it may be necessary to assess the security vulnerability of other computer devices (e.g., multiple target devices 103) before validating those devices and granting them access to secure network domains. In some embodiments, the validation server 102 downloads an offline copy of the binaries-to-vulnerabilities mapping database 105 (the offline vulnerability database 110). Additionally, the validation server 102 receives target binary data 111 (from the target device 103) that generally includes binary data 112 (in the same form as that described above for the product binary data was), and a file path 113, for each of the binary files scanned from the target device 103.

The target device 103 is generally any appropriate computer device that a user may use to access the secure environment 104, such as a desktop computer, notebook computer, tablet computer, smartphone, server, etc. In some embodiments, the target device 103 is capable of being loaded as an external storage device by the validation server 102 when the target device 103 is turned off. In this manner, the various files (for the target binary data 111) contained in the target device 103 can be safely read by the validation server 102 in the same manner as reading data files from any mass storage device (e.g., a hard drive, optical drive, flash memory device, etc.) while the target device 103 is not operating and cannot present a vulnerability risk.

Additionally, since the vulnerability scan performed by the vulnerability database system 100 is performed by the validation server 102, rather than by the target device 103, no additional software for scanning purposes needs to be installed on the target device 103. This technique is in contrast with conventional security vulnerability assessment systems that require the target device to be turned on in order to run the vulnerability assessment scan. The software that needs to be executed on the target device to perform a conventional vulnerability scan could potentially affect the security vulnerability of the target device. This potential issue is avoided by using the target device 103 as an external storage device for the validation server 102, particularly when the target device 103 is turned off before being loaded as the external storage device, since there is no chance that the security vulnerability of the target device 103 could be affected by this scanning technique.

In some situations, security vulnerability can depend on the particular combination of different software products on the same device. Additionally, sometimes security vulnerability can depend on the particular combination of software products with hardware products on the same device. Therefore, in some embodiments, data for combinations of software components 114 and hardware components 115 in the target device 103 forms at least part of the target binary data 111 (e.g., software/hardware configuration data 116).

Using the product binary data of the offline vulnerability database 110, the validation server 102 scans through the target binary data 111 to find matches between the target binary data 111 and the product binary data. Using any matches (results of the scanning) and the product vulnerability data of the offline vulnerability database of 110, the validation server 102 consolidates the information and generates a target device vulnerability report 117 therefrom. The target device vulnerability report 117 generally includes the binary data 112, the file paths 113, and the known vulnerabilities. Alternatively, in some embodiments, generation of the target device vulnerability report 117 is optional. In some embodiments, this data is returned via an API (application programming interface) or any other form of programming communication methodology.

Given the target device vulnerability report 117, either an access control application 118 or a system administrator 119 can analyze the security vulnerability level of the target device 103 to determine whether to grant or deny access by the target device 103 to the secure environment 104. In some embodiments, the security vulnerability level may be provided as a score value indicating a level of vulnerability of the target device 103. For example, the security vulnerability level may be zero if no known vulnerabilities are found, a low value if only a few vulnerabilities are found, or a high value if a relatively large number of vulnerabilities are found. In some embodiments, the target device 103 may have no known security vulnerability if no vulnerabilities with a risk level over a particular risk threshold have been discovered. In some embodiments, the security vulnerability level may be simply a pass/fail determination. In some embodiments, to grant access by the target device 103, an access control application 120 that manages access to the secure environment 104 is configured (e.g., by the access control application 118 or the system administrator 119) to allow the target device 103 to connect to any network or computer devices within the secure environment 104.

FIG. 2 shows an example for a simplified database structure for the binaries-to-products mapping database 106, and FIG. 3 shows an example for a simplified database structure for the products-to-vulnerabilities mapping database 107, in accordance with some embodiments. In this embodiment, the binaries-to-products mapping database 106 includes fields for the name of each individual software product, the version designator for the version of the software product, and the corresponding binary files containing the product binary data for the software product. Additionally, the products-to-vulnerabilities mapping database 107 includes fields for the name of each individual software product, the version designator for the version of the software product, and the corresponding vulnerability files containing the product vulnerability data for known vulnerabilities for the software product.

FIG. 4 shows an example for a simplified database structure for an intermediate database 400 that combines the data from the binaries-to-products mapping database 106 and the products-to-vulnerabilities mapping database 107, in accordance with some embodiments. Using the data from the databases 106 and 107, the vulnerability database system 101 generates the intermediate database 400 to include fields for the name of each individual software product (from databases 106 and 107), the version designator for the version of the software product (from databases 106 and 107), the binary files containing the product binary data for the software product (from database 106), and the vulnerability files containing the product vulnerability data for known vulnerabilities for the software product (from database 107). The intermediate database 400, therefore, provides a link between the binary files containing the binary data and the known vulnerabilities. With additional processing of the intermediate database 400 by the vulnerability database system 101, the links between the individual binary files and the corresponding known vulnerabilities are determined, and the binaries-to-vulnerabilities mapping database 105 is generated therefrom, e.g., as shown in FIG. 5. In other embodiments, the vulnerability database system 101 processes the data from the databases 106 and 107 to generate the binaries-to-to-vulnerabilities mapping database 105 without forming the intermediate database 400.

FIG. 5 shows an example for a simplified database structure for the binaries-to-vulnerabilities mapping database 105, in accordance with some embodiments. In this embodiment, the binaries-to-vulnerabilities mapping database 105 includes fields for the binary files containing the product binary data for each the software product and the corresponding vulnerability files containing the product vulnerability data for known vulnerabilities related to the product binary data in the binary files. Additionally, the simplified database structure for the binaries-to-vulnerabilities mapping database 105 shown in FIG. 5 is also provided for the offline vulnerability the database 110 downloaded and used by the validation server 102.

FIG. 6 shows an example for a simplified database structure for the target device vulnerability report 117, in accordance with some embodiments. In some embodiments, the security vulnerability of the target device 103 is provided as a listing of the designation of the binary data, the binary hash data, and the file path of the binary file (from which the data was extracted or generated) along with a designation or description of the known vulnerabilities that correspond to be binary data. In the illustrated example, Binary_1 is a designation of a particular instance of binary data in the offline vulnerability database 110 that was found to match a particular instance of binary data in a binary file that was read from the target device 103. Additionally, Hash_1 is a hash of the binary data, or alternatively a designation of a particular instance of a hash of the binary data. Filepath_1 is the file path for locating the binary file (on the target device 103) that matched the particular instance of binary data in the offline vulnerability database 110. Vulner_1, Vulner_2, etc. are designations or descriptions of the known vulnerabilities that have been linked to, or correspond to, the particular instance of binary data. At a minimum, the report generally includes the designations of the binary data and the known vulnerabilities. With the addition of the file path information, the system administrator 119 of the validation server 102, the access control application 118, or a user of the target device 103 can quickly locate the vulnerable binary files in the target device 103 in order to remove them, replace them, or take other actions.

FIG. 7 shows a simplified flow chart of a process 700 performed by the community client application running on the community client devices 108 to produce the product binary data and the corresponding product version identification data for the binaries-to-products mapping database 106. The particular steps, order of steps, and combination of steps is shown for explanatory purposes only. Other embodiments may use other steps or combinations of steps or in a different order to perform the same general function. Additionally, one or more applications or routines can perform the process 700.

Upon starting (at 701), the community client application detects (at 702) the applications or software products installed on the community client device 108. Thus, the community client application reads and stores the file names and file paths for all of the software products contained or installed in the community client device 108. Alternatively, the community client application can read this information from a preexisting listing in the community client device 108. At 703, the community client application collects the relevant binary information or data for each of the detected application. Thus, the community client application reads the binary data for the files of each detected application and then either generates and stores a hash of the binary data or stores the original binary data. In some embodiments, the community client application collects or generates this data with an endpoint assessment software available with such products as the OESIS Framework™ by Opswat, Inc., including Metadefender Endpoint Management™, as well as other solutions, Cisco AnyConnect™, F5 BIG-IP™, or similar types of products. At 704, the community client application maps, links or correlates the binary data (e.g., the hash or the original data) to the product and version combination. Thus, the community client application generates and stores information that links the binary data, the software product name, the version of the software product, the file name for the application of the software product, and any other appropriate information with which to form binary-to-product/version information. At 705, the community client application submits the binary-to-product/version information to the vulnerability database system 101. Thus, the community client application causes the community client device 108 to generate file transfer packets and transmit them through a network (e.g., the Internet, a LAN, a WAN, etc.) to the vulnerability database system 101. In some embodiments, the community client device 108 submits the information via a REST (representational state transfer) API post action to the vulnerability database system 101.

FIG. 8 shows a simplified flow chart of a process 800 performed by the vulnerability database system 101 to produce the binaries-to-vulnerabilities mapping database 105. The particular steps, order of steps, and combination of steps is shown for explanatory purposes only. Other embodiments may use other steps or combinations of steps or in a different order to perform the same general function. Additionally, one or more applications or routines can perform the process 800.

Upon starting (at 801), the vulnerability database system 101 receives (at 802) the binary-to-product/version information from the community client device 108. Thus, the vulnerability database system 101 receives the file transfer packets, parses the data contained therein, and extracts the binary-to-product/version information. At 803, the vulnerability database system 101 stores the binary data with an index of the product and version combination. Thus, the vulnerability database system 101 reads the information received from the community client device 108 and stores it in the binaries-to-products mapping database 106, e.g., as shown in FIG. 2. Concurrent with or independent of 802 and 803, the vulnerability database system 101 also periodically downloads and processes (at 804) the public vulnerability data. Thus, the vulnerability database system 101 receives, parses, processes and stores the known product vulnerability and severity information from the variety of sources 109, described above. At 805, the vulnerability database system 101 stores the vulnerability data with an index of the product and version combination. Thus, the vulnerability database system 101 reads the information received from the variety of sources 109 and stores it in the binaries-to-products mapping database 107, e.g., as shown in FIG. 3. At 806, the vulnerability database system 101 processes the data from the two databases 106 and 107 to generate the relationships between the binary data and the vulnerability data. Thus, the vulnerability database system 101 reads and scans through the product and version combination information in the databases 106 and 107 to find matching product data with which to generate, compile and store the data for the intermediate database 400, e.g., as shown in FIG. 4, thereby linking the binary files with the known vulnerabilities. The vulnerability database system 101 then reads and stores the binary files and the corresponding known vulnerabilities in the binaries-to-vulnerabilities mapping database 105, e.g., as shown in FIG. 5.

FIG. 9 shows a simplified flow chart of a process 900 performed by the target device 103 to connect to the validation server 102. The particular steps, order of steps, and combination of steps is shown for explanatory purposes only. Other embodiments may use other steps or combinations of steps or in a different order to perform the same general function. Additionally, one or more applications or routines can perform the process 900.

Upon starting (at 901), the target device 103 connects (at 902) to the validation server 102 as an external file storage device. Thus, the target device 103 configures itself as a storage device when the validation server 102 establishes a communication link with it, e.g., via Firewire™, USB (Universal Serial Bus), WiFi, etc. In some embodiments, the target device 103 does not need to be in an operational state as long as the hosted files are accessible by the validation server 102. In such embodiments, the communication link with the validation server 102 may have to be wired, rather than wireless. In some embodiments, the user of the target device 103 turns off or powers down the target device 103, so that the target device 103 connects to the validation server 102 while turned off. Thus, when the validation server 102 attempts to connect to the target device 103, the target device 103 activates a functionality that allows access to its hard drive or mass storage device while the rest of the target device 103, including the CPU, remains powered down or turned off. The "target disk mode" function of some computer systems available from Apple Computer Corp. and the FlashMate™ alternative hybrid-drive functionality are examples of this technique of loading an unpowered target device as an external storage device.

FIG. 10 shows a simplified flow chart of a process 1000 performed by the validation server 102 to scan the target device 103 and generate the target device vulnerability report 117. The particular steps, order of steps, and combination of steps is shown for explanatory purposes only. Other embodiments may use other steps or combinations of steps or in a different order to perform the same general function. Additionally, one or more applications or routines can perform the process 1000.

Upon starting (at 1001), the validation server 102 downloads (at 1002) the binaries-to-vulnerabilities mapping database 105 as an offline update package (e.g., the offline vulnerability database 110). Thus, the validation server 102 receives and stores the product binary data and the product vulnerability data. At 1003, the validation server 102 loads the target device 103 as an external file storage device. Thus, the validation server 102 establishes a communication link with the target device 103, the target device 103 configures itself as a storage device (as described above), and the validation server 102 configures itself to use the target device 103 as an external storage device. At 1004, the validation server 102 scan the first binary file in the target device 103 against the offline version of the binaries-to-vulnerabilities mapping database 105 (the offline vulnerability database 110). Thus, the validation server 102 reads the target binary data from the first binary file of the target device 103 and searches through the target binary data to find matches between the target binary data and the product binary data in the offline vulnerability database 110. A match indicates that the binary file contains a known vulnerability, as determined at 1005. In this case, the validation server 102 logs (at 1006) the binary file name, the file path, and the vulnerability information. Thus, the validation server 102 reads and stores the relevant data from the target binary data and the offline vulnerability database 110. If there was no match (at 1005) or after logging the data (at 1006), and if the validation server 102 has not reached the last binary file (as determined at 1007), then the validation server 102 selects (at 1008) the next binary file and repeats 1004-1008 until all of the binary files on the target device 103 have been scanned.

In some embodiments, the validation server 102 provides different levels of vulnerability assessment for the target device 103, and the validation server 102 receives an indication from the system administrator 119 of which level of vulnerability assessment that is to be performed on the target device 103. For example, a first vulnerability assessment level (referred to herein as a "quick" assessment) scans (at 1004-1008) only those executable binary files that the target device 103 actually runs or executes. A second vulnerability assessment level (referred to herein as a "deep" assessment) scans (at 1004-1008) the executable binary files that the target device 103 actually runs or executes along with the library files used by the executable binary files. A third vulnerability assessment level (referred to herein as a "full" assessment) scans (at 1004-1008) all of the binary files hosted or stored on the target device 103. In some embodiments, the quick assessment and the deep assessment scan those binary files that the target device 103 is currently running or executing while the validation server 102 is receiving, reading and/or scanning them, which means that the target device 103 is powered on for these assessments. On the other hand, since the full assessment is not concerned with which binary files the target device 103 executes, this assessment can be performed with the target device 103 powered off. In some embodiments, the target device 103 maintains a stored list of the binary files that it has executed, has executed recently, or has executed most often. In this case, the validation server 102 downloads the stored list, so the quick and deep assessments can be performed with the target device 103 powered off.

After scanning the last binary file (as determined at 1007), the validation server 102 consolidates the scan results into the target device vulnerability report 117 (at 1009). Thus, the validation server 102 assembles all of the target binary data and known vulnerability data and stores it together in the target device vulnerability report 117, e.g., as shown in FIG. 6.

FIG. 11 shows a simplified schematic diagram showing an example computing system(s) 1100 for use as the vulnerability database system 101, in accordance with some embodiments. Other embodiments may use other components and combinations of components. For example, the computing system 1100 may represent one or more physical computer devices, such as web servers, rack-mounted computers, network storage devices, desktop computers, laptop/notebook computers, etc. In some embodiments implemented at least partially in a cloud network potentially with data synchronized across multiple geolocations, the computing system 1100 may be referred to as a cloud server or cloud database. In some embodiments, the functions of the computing system 1100 are enabled in a single computer device. In more complex implementations, some of the functions of the computing system 1100 are distributed across multiple computer devices, whether within a single server farm facility or multiple physical locations. In some embodiments wherein the computing system 1100 represents multiple computer devices, some of the functions of the computing device 1100 are implemented in some of the computer devices, while other functions are implemented in other computer devices. In the illustrated embodiment, the computing system 1100 generally includes at least one processor 1101, a main electronic memory 1102, a data storage 1103, a user I/O 1104, and a network I/O 1105, among other components not shown for simplicity, connected or coupled together by a data communication subsystem 1106.

The processor 1101 represents one or more central processing units on one or more PCBs in one or more housings or enclosures. In some embodiments, the processor 1101 represents multiple microprocessor units in multiple computer devices at multiple physical locations interconnected by one or more data channels, such as the Internet, a WAN, a LAN, etc. When executing computer-executable instructions for performing the above described functions of the vulnerability database system 101 in cooperation with the main electronic memory 1102, the processor 1101 becomes a special purpose computer for performing the functions of the instructions.

The main electronic memory 1102 represents one or more RAM modules on one or more PCBs in one or more housings or enclosures. In some embodiments, the main electronic memory 1102 represents multiple memory module units in multiple computer devices at multiple physical locations. In operation with the processor 1101, the main electronic memory 1102 stores the computer-executable instructions executed by, and data processed by, the processor 1101 to perform the above described functions of the vulnerability database system 101.

The data storage 1103 represents or comprises any appropriate number or combination of internal or external physical mass storage devices, such as hard drives, optical drives, network-attached storage (NAS) devices, flash drives, etc. In some embodiments, the data storage 1103 represents multiple mass storage devices in multiple computer devices at multiple physical locations. The data storage 1103 generally provides persistent storage 1107 (e.g., a non-transitory computer readable medium) for the programs (e.g., computer-executable instructions) and data used in operations described above for the vulnerability database system 101 (e.g., operations of the processor 1101 and the main electronic memory 1102), such as, but not limited to, the databases 105, 106 and 107 described above, a parsing routine 1108 (for parsing data), a searching routine 1109 (for searching through data for desired data), a comparing routine 1110 (for comparing different data to find a match), a reading routine 1111 (for reading data from the main electronic memory 1102 or persistent storage 1107), a storing routine 1112 (for storing data in the main electronic memory 1102 or persistent storage 1107), a network communication application 1113 (for generating/parsing data packets to transmit/receive data to/from the community client device 108, the various products and vulnerabilities information sources 109, and the validation server 102), and a database management application 1114 (for generating, managing and accessing the databases 105, 106 and 107), among others not shown for simplicity. Under control of these programs and using this data, the processor 1101, in cooperation with the main electronic memory 1102, performs the above described functions for the vulnerability database system 101.

The user I/O 1104 represents one or more appropriate user interface devices, such as keyboards, pointing devices, displays, etc. In some embodiments, the user I/O 1104 represents multiple user interface devices for multiple computer devices at multiple physical locations. A system administrator, for example, may use these devices to access, setup and control the computing system 1100.

The network I/O 1105 represents any appropriate networking devices, such as network adapters, etc. for communicating through a network, such as the Internet, a WAN, a LAN, etc. In some embodiments, the network I/O 1105 represents multiple such networking devices for multiple computer devices at multiple physical locations for communicating through multiple data channels. The computing system 1100 communicates with the community client device 108, the various products and vulnerabilities information sources 109, and the validation server 102 through the network I/O 1105 to send and receive data and requests for data in order to generate and share the databases 105, 106 and 107.

The data communication subsystem 1106 represents any appropriate communication hardware for connecting the other components in a single unit or in a distributed manner on one or more PCBs, within one or more housings or enclosures, within one or more rack assemblies, within one or more physical facilities, etc.

Figure 12:
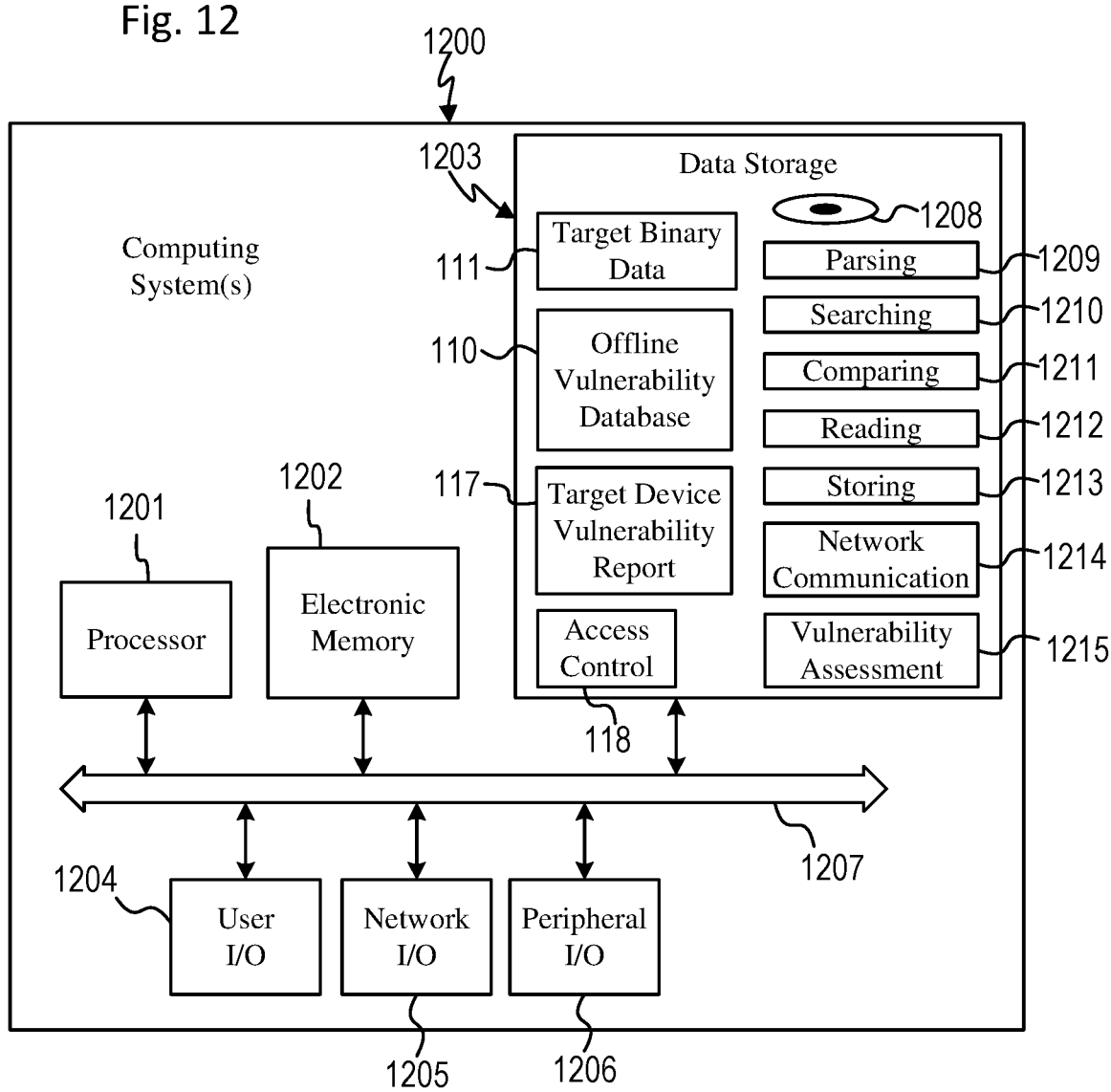
FIG. 12 is a simplified schematic diagram of a validation server for use in the example computer security vulnerability assessment system shown in FIG. 1, in accordance with some embodiments.

FIG. 12 shows a simplified schematic diagram showing an example computing system(s) 1200 for use as the validation server 102, in accordance with some embodiments. Other embodiments may use other components and combinations of components. For example, the computing system 1200 may represent one or more physical computer devices, such as web servers, rack-mounted computers, network storage devices, desktop computers, laptop/notebook computers, etc. In some embodiments implemented at least partially in a cloud network potentially with data synchronized across multiple geolocations, the computing system 1200 may be referred to as a cloud server. In some embodiments, the functions of the computing system 1200 are enabled in a single computer device. In more complex implementations, some of the functions of the computing system 1200 are distributed across multiple computer devices, whether within a single server farm facility or multiple physical locations. In some embodiments wherein the computing system 1200 represents multiple computer devices, some of the functions of the computing device 1200 are implemented in some of the computer devices, while other functions are implemented in other computer devices. In the illustrated embodiment, the computing system 1200 generally includes at least one processor 1201, a main electronic memory 1202, a data storage 1203, a user I/O 1204, a network I/O 1205, and a peripheral I/O 1206, among other components not shown for simplicity, connected or coupled together by a data communication subsystem 1207.

The processor 1201 represents one or more central processing units on one or more PCBs in one or more housings or enclosures. In some embodiments, the processor 1201 represents multiple microprocessor units in multiple computer devices at multiple physical locations interconnected by one or more data channels, such as the Internet, a WAN, a LAN, etc. When executing computer-executable instructions for performing the above described functions of the validation server 102 in cooperation with the main electronic memory 1202, the processor 1201 becomes a special purpose computer for performing the functions of the instructions.

The main electronic memory 1202 represents one or more RAM modules on one or more PCBs in one or more housings or enclosures. In some embodiments, the main electronic memory 1202 represents multiple memory module units in multiple computer devices at multiple physical locations. In operation with the processor 1201, the main electronic memory 1202 stores the computer-executable instructions executed by, and data processed by, the processor 1201 to perform the above described functions of the validation server 102.

The data storage 1203 represents or comprises any appropriate number or combination of internal or external physical mass storage devices, such as hard drives, optical drives, network-attached storage (NAS) devices, flash drives, etc. In some embodiments, the data storage 1203 represents multiple mass storage devices in multiple computer devices at multiple physical locations. The data storage 1203 generally provides persistent storage 1208 (e.g., a non-transitory computer readable medium) for the programs (e.g., computer-executable instructions) and data used in operations described above for the validation server 102 (e.g., operations of the processor 1201 and the main electronic memory 1202), such as, but not limited to, the target binary data 111, the offline vulnerability database 110, the target device vulnerability report 117, the access control application 118, a parsing routine 1209 (for parsing data), a searching routine 1210 (for searching through data for desired data), a comparing routine 1211 (for comparing different data to find a match), a reading routine 1212 (for reading data from the main electronic memory 1202 or persistent storage 1208), a storing routine 1213 (for storing data in the main electronic memory 1202 or persistent storage 1208), a network communication application 1214 (for generating/parsing data packets to transmit/receive data to/from the vulnerability database system 101 and the secure environment 104), and a vulnerability assessment application 1215 (for managing the functions described above for performing the vulnerability assessment to determine the security vulnerability of the target device 103), among others not shown for simplicity. Under control of these programs and using this data, the processor 1201, in cooperation with the main electronic memory 1202, performs the above described functions for the validation server 102.

The user I/O 1204 represents one or more appropriate user interface devices, such as keyboards, pointing devices, displays, etc. In some embodiments, the user I/O 1204 represents multiple user interface devices for multiple computer devices at multiple physical locations. The system administrator 119, for example, may use these devices to access, setup and control the computing system 1200 and, in some embodiments, to review the target device vulnerability report 117 and determine whether to grant access by the target device 103 to the secure environment 104.

The network I/O 1205 represents any appropriate networking devices, such as network adapters, etc. for communicating through a network, such as the Internet, a WAN, a LAN, etc. In some embodiments, the network I/O 1205 represents multiple such networking devices for multiple computer devices at multiple physical locations for communicating through multiple data channels. The computing system 1200 communicates with the vulnerability database system 101 and the secure environment 104 through the network I/O 1205 to send and receive data and requests for data (e.g., for the offline vulnerability database 110) in order to perform the vulnerability assessment and generate the target device vulnerability report 117.

The peripheral I/O 1206 represents any appropriate peripheral interface devices, such as serial ports, parallel ports, USB ports, Firewire™ ports, SCSI (Small Computer System Interface) ports, PCI (Peripheral Component Interconnect) ports, etc. In some embodiments, the peripheral I/O 1206 represents multiple such peripheral interface devices for multiple computer devices at multiple physical locations for communicating through multiple protocols. The computing system 1200 communicates with the target device 103 through the peripheral I/O 1206 to send and receive data and requests for data in order to receive the target binary data 111 in order to perform the vulnerability assessment and generate the target device vulnerability report 117.

The data communication subsystem 1207 represents any appropriate communication hardware for connecting the other components in a single unit or in a distributed manner on one or more PCBs, within one or more housings or enclosures, within one or more rack assemblies, within one or more physical facilities, etc.

Various features of the computer security vulnerability assessment system 100 represent improvements in various different fields. For example, the use of the binary data with the binaries-to-vulnerabilities mapping database 105 and the use of the turned-off target device 103 as an external storage device represent improvements in the fields of security vulnerability assessment, secure domain or network access control, database generation and maintenance, and computer system security. In particular, these features enable a more thorough, more robust and more flexible system, since they operate with binary data mapped to vulnerability data, instead of, or in addition to, operating with application file names or other high level meta data. Additionally, these features enable a more secure system, since they operate with a turned-off target device, instead of a turn-on target device in which ongoing operations could affect the vulnerability assessment. Furthermore, these features may also represent improvements in additional fields, and other features may represent improvements in these and other fields. The computer security vulnerability assessment system 100 described above also addresses the Internet-centric challenge of coordinating among different entities to manage communications, collect electronic information from disparate data sources across the Internet, and enable enhanced computer security vulnerability assessment and target device validation at various desired locations. Additionally, the computer security vulnerability assessment system 100 described above does not preempt the field of security vulnerability assessment, because many other techniques for security vulnerability assessment are readily available; whereas the technique described herein is simply directed to the improvements thus enabled. Furthermore, it is noted that the security vulnerability assessment features make sense only in the context of a computing system, since significant portions of the features involve complex traversal of a very large quantity of data with highly complicated interrelations and calculations and functions that a person would not need or be able to perform. In particular, a human cannot read through the binary data used by the present system.

Although embodiments of the invention have been discussed primarily with respect to specific embodiments thereof, other variations are possible. Various configurations of the described structures or processes may be used in place of, or in addition to, the configurations presented herein.

Those skilled in the art will appreciate that the foregoing description is by way of example only, and is not intended to limit the invention. Nothing in the disclosure should indicate that the invention is limited to systems that are implemented on a single computerized system. In general, any diagrams presented are only intended to indicate one possible configuration, and many variations are possible. Those skilled in the art will also appreciate that methods and systems consistent with the present invention are suitable for use in a wide range of applications encompassing NAC systems.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A method comprising:
   receiving, by a computerized system, binary data and first product identification data that correspond to each other, the binary data including first binary hashes formed from a hash technique using strings of bits, extracted from at least a portion of binary-level files of software products;

receiving, by the computerized system, vulnerability data and second product identification data that correspond to each other;

determining, by the computerized system, correspondence between the binary data and the vulnerability data based on matching the first product identification data with the second product identification data;

establishing, by the computerized system, a communication connection to a target device;

receiving, by the computerized system, binary files from the target device;

generating, by the computerized system, second binary hashes formed from the same hash technique using strings of bits extracted from at least a portion of the binary files;

scanning, by the computerized system using the binary data, the second binary hashes to find matches between the second binary hashes and the first binary hashes;

determining, by the computerized system, a known vulnerability of the target device based on 1) results of the scanning and 2) the correspondence between the binary data and the vulnerability data; and generating, by the computerized system, a binaries-to-vulnerabilities database based on the determined correspondence between the binary data and the vulnerability data;

wherein the determining of the known vulnerability further comprises generating an assessment result containing at least a listing of 1) designations of the first binary hashes that were found to match the second binary hashes, and 2) designations of the vulnerability data that correspond to the binary data that includes the first binary hashes that were found to match the second binary hashes.

2. The method of claim 1, wherein the binaries-to-vulnerabilities database is downloaded and used offline.

3. The method of claim 1, wherein at least a part of the binary files from the target device are formed from a software component and a hardware component.

4. The method of claim 1, further comprising:
granting, by the computerized system, access by the target device to a secure environment based on determining that the target device has no known vulnerability; and
denying, by the computerized system, access by the target device to the secure environment based on determining that the target device has the known vulnerability.

5. The method of claim 1, wherein the known vulnerability is a vulnerability of the target device to a malicious event, regardless of whether malicious code is present on the target device.

6. The method of claim 1, wherein:
the target device is a computer that has been turned off; and
the establishing of the communication connection further comprises loading the target device as an external storage device of the computerized system.

7. The method of claim 1, wherein:
the receiving of the binary data and the first product identification data further comprises collecting, by the computerized system, the binary data and the first product identification data from a plurality of client devices; and
each client device collects the binary data and the first product identification data related to software products that are on that client device and maps the binary data to the corresponding first product identification data for each of the software products.

8. The method of claim 1, further comprising:
receiving, by the computerized system, an indication of one of a first, second or third level of vulnerability assessment to be performed on the target device;
wherein:
in the first level of vulnerability assessment, the binary files are executable binary files;
in the second level of vulnerability assessment, the binary files are the executable binary files and library files used by the executable binary files; and
in the third level of vulnerability assessment, the binary files are all binary files stored on the target device.

9. A non-transitory machine-readable medium storing instructions executable by a server device for enabling the server device to conduct a computer-implemented method, the method comprising:
receiving, by the server device, binary data and first product identification data that correspond to each other, the binary data including first binary hashes formed from a hash technique using strings of bits, extracted from at least a portion of binary-level files of software products;
receiving, by the server device, vulnerability data and second product identification data that correspond to each other;
determining, by the server device, correspondence between the binary data and the vulnerability data based on matching the first product identification data with the second product identification data;
establishing, by the server device, a communication connection to a target device;
receiving, by the server device, binary files from the target device;
generating, by the server device, second binary hashes formed from the same hash technique using strings of bits extracted from at least a portion of the binary files;
scanning, by the server device using the binary data, the second binary hashes to find matches between the second binary hashes and the first binary hashes;
determining, by the server device, a known vulnerability of the target device based on 1) results of the scanning and 2) the correspondence between the binary data and the vulnerability data; and
generating, by the server device, a binaries-to-vulnerabilities database based on the determined correspondence between the binary data and the vulnerability data;
wherein the determining of the known vulnerability further comprises generating an assessment result containing at least a listing of 1) designations of the first binary hashes that were found to match the second binary hashes, and 2) designations of the vulnerability data that correspond to the binary data that includes the first binary hashes that were found to match the second binary hashes.

10. The non-transitory machine-readable medium of claim 9, wherein the binaries-to-vulnerabilities database is downloaded and used offline.

11. The non-transitory machine-readable medium of claim 9, wherein at least a part of the binary files from the target device are formed from a software component and a hardware component.

12. The non-transitory machine-readable medium of claim 9, further comprising:
granting, by the server device, access by the target device to a secure environment based on determining that the target device has no known vulnerability; and denying, by the server device, access by the target device to the secure environment based on determining that the target device has the known vulnerability.

13. The non-transitory machine-readable medium of claim 9, wherein the known vulnerability is a vulnerability of the target device to a malicious event, regardless of whether malicious code is present on the target device.

14. The non-transitory machine-readable medium of claim 9, wherein:
the target device is a computer that has been turned off; and
the establishing of the communication connection further comprises loading the target device as an external storage device of the server device.

15. The non-transitory machine-readable medium of claim 9, wherein:
the receiving of the binary data and the first product identification data further comprises collecting, by the server device, the binary data and the first product identification data from a plurality of client devices; and
each client device collects the binary data and the first product identification data related to software products that are on that client device and maps the binary data to the corresponding first product identification data for each of the software products.

16. The non-transitory machine-readable medium of claim 9, further comprising:
receiving, by the server device, an indication of one of a first, second or third level of vulnerability assessment to be performed on the target device;
wherein:
in the first level of vulnerability assessment, the target binary files are executable binary files;
in the second level of vulnerability assessment, the target binary files are the executable binary files and library files used by the executable binary files; and
in the third level of vulnerability assessment, the target binary files are all binary files stored on the target device.

* * * * *